ABSTRACT OF THE DISCLOSURE

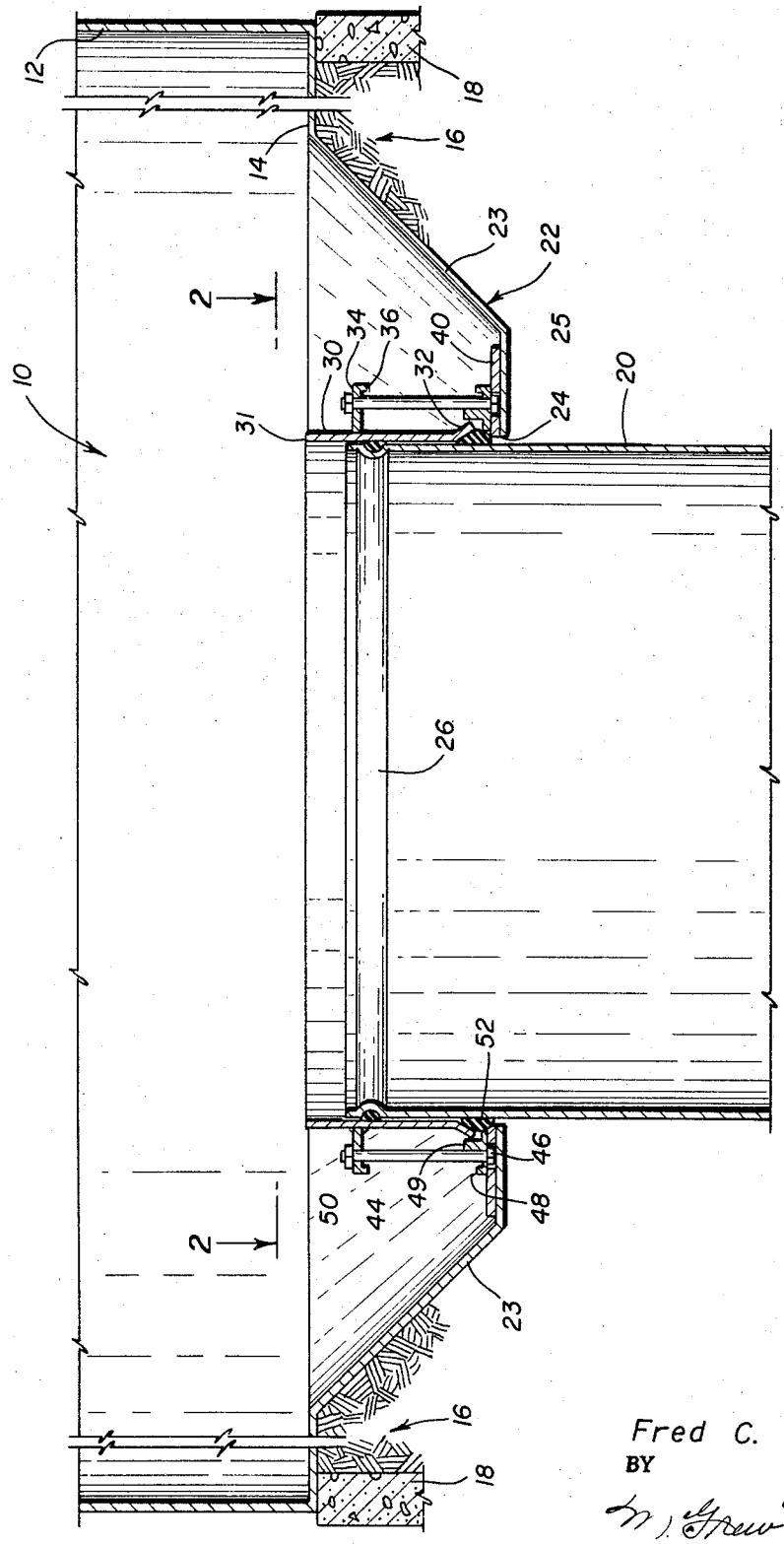

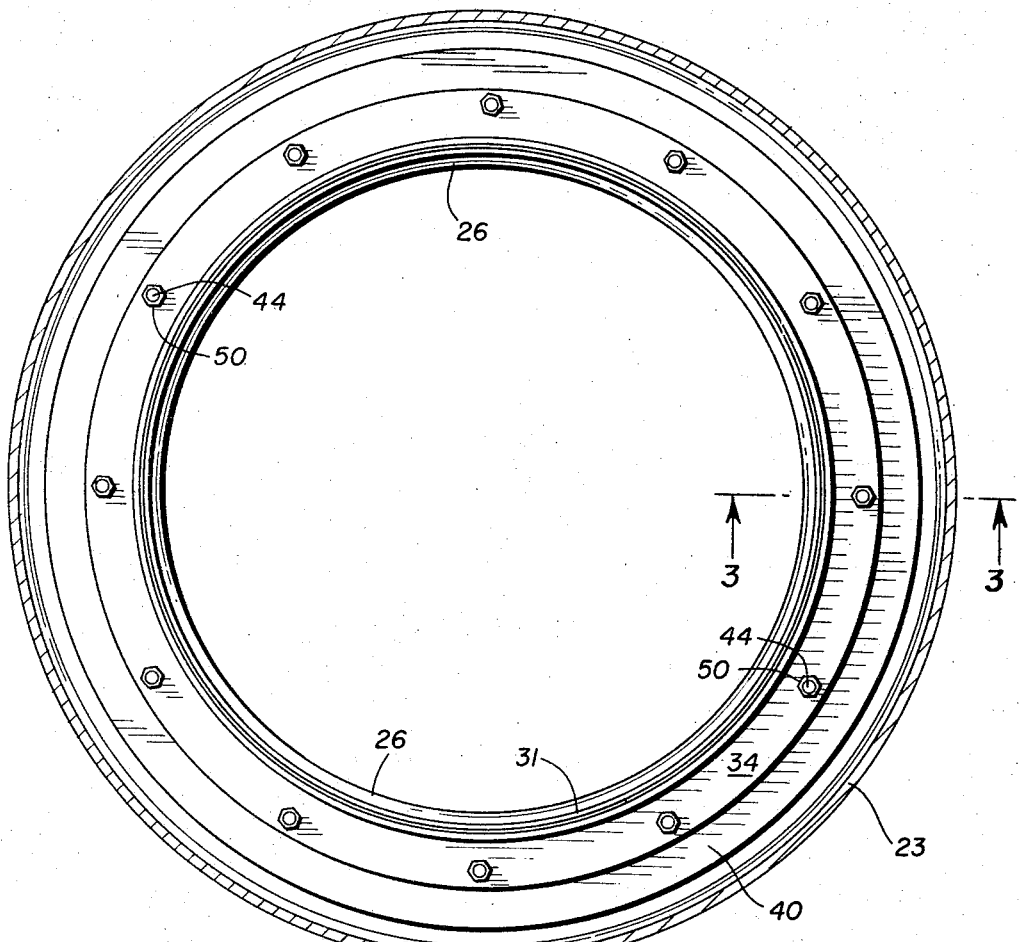
Fig_2
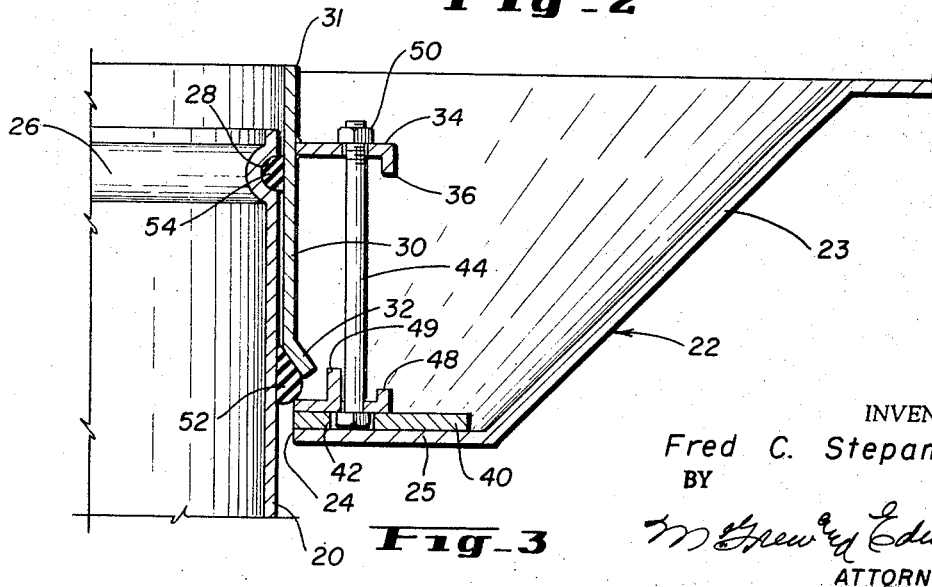
Fig_3
INVENTOR.
Fred C. Stepanich
BY
McGrew & Edwards
ATTORNEYS (# 3,345,089
CONNECTOR BETWEEN A PIPE AND A TANK
Fred C. Stepanich, 1106 Berkley, Pueblo, Colo. 81004
Filed Apr. 30, 1965, Ser. No. 452,311
2 Claims. (Cl. 285—189)

A flexible connector between large diameter inlet and outlet pipes and metal walled tanks or reservoirs to permit relative movement therebetween passes the pipe end through an opening in the bottom wall of the tank, and a flanged sleeve is telescoped over the internally protruding end of the pipe. A pair of spaced gaskets are mounted and retained in position between the pipe and sleeve, and bolts secure the sleeve to the tank bottom.

---

This invention relates to pipe-to-tank connections and more particularly to flexible connections between outdoor large metal tanks and relatively large pipes used for filling and/or draining such tanks.

Large metal tanks or reservoirs are extensively used to store water for urban use. Such tanks have a large diameter steel floor and, typically, they are set on peripheral footings with a central tamped dirt back fill. The inlet and outlet pipes are normally relatively large and of welded steel construction. The usual method of attachement of the welded steel pipes to such tanks is by welding the pipe to the tank floor. These welded connections, however, are subjected to overstressing due to soil pressures (heaving or depressing) causing rupture of the joint at the weld. When the joint between the pipe and the tank floor ruptures, it requires draining the reservoir, digging to the joint, and re-welding so as to prevent a recurrence of the rupture.

According to the present invention, I have provided a flexible connection between the metal tank floor and a steel pipe which permits relative movement between the two members thereby preventing rupture. The connection is simple to manufacture and is easy to install during the erection of the tank and its connecting lines. It is, furthermore, easily repaired from inside the tank. The connection provides a double, flexible seal permitting movement while maintaining a tight seal under the conditions of use of the tank.

Included among the objects and advantages of the present invention is a flexible connection between the metal tank floor or bottom and a metal pipe which permits limited movement therebetween without rupturing the connection. The connection of the invention provides a double, resilient seal and means for supporting the pipe in a movable alignment with the opening in the metal bottom of a tank. The connection of the invention is arranged so that the pipe is not physically affixed to the tank bottom but is reciprocally mounted therein with the seals preventing leaking between the two members.

These and other objects and advantages of the invention may be readily ascertained by referring to the following description and appended illustrations wherein:

FIG. 1 is a cross-sectional view of a connection according to the invention;

FIG. 2 is a top plan view of the pipe and its connection to the tank; and

FIG. 3 is an enlarged detail view of a portion of the connection in FIG. 1 illustrating the details of the connection between a pipe and a tank.

In the device selected for illustration in FIG. 1, a tank shown in general by numeral 10 includes a peripheral side wall 12 and a floor 14 affixed thereto. The wall 12 is normally a steel wall erected in sections which are welded or riveted or otherwise secured in watertight relationship, and in a like manner the floor is sectioned, and the sections welded or riveted together in watertight relationship. The tank may be of substantial size to provide water for an urban community. Such tanks are normally set on compacted ground, for example as indicated at 16, with a peripheral footing wall 18 around the outer edge so that the tank wall actually sits on a footing. Such tanks are also normally covered to prevent contamination of the water. When containing hundreds of thousands or even millions of gallons of water, a substantial weight, of course, is exerted on its supporting ground. Such tanks are provided with inlet and outlet pipes which are conventionally welded to the tank bottom.

The pipe 20 extends downwardly from a recess 22 in the tank bottom, and it extends through an opening 24 in bottom 25 of the recess. Since the tank rests on the ground and the inlet or outlet pipe is placed a distance inwardly from the wall, the pipe extends downwardly below the tank a short distance, and then is turned at a 90° angle to extend beyond the tank edge. The elbow or 90° turn is conventionally set in a concrete footing to support the pipe in an attempt to prevent undue movement. This is particularly important where leakage occurs since the wetting of the soil at the leak reduces the supporting power of the soil and increases stress on the pipe-tank joint. In the connection illustrated in detail in FIG. 3, the pipe 20 is provided with an internal bead 26 which provides an outwardly directed groove 28. A sleeve 30 with a flared bottom 32 telescopes over the end of the pipe 20 which is inside the tank, and the pipe 20 is reciprocable in the sleeve 30. A radial flange or follower ring 34 with an axial lip 36 is welded to the sleeve 30 adjacent its upper end 31.

The recess or tank indentation 22 includes a biased wall 23 and a generally horizontal wall 25 through which the opening 24 passes. A ring 40 having a plurality of holes 42 is welded or otherwise affixed to the bottom 25. A plurality of bolts 44 are mounted in the openings 42 and extend upright from the ring 40. The heads of the bolts are held in the openings by means of a follower ring 48 having an inner axial flange 49 welded to the ring 40. Bolts pass through registered openings in the flange 34 and nuts 50 hold the unit together. The inner flange 49 is faced inwardly toward and forms a stop for the flared end 32 of the sleeve and a gasket 52 is arranged between the two members. By pulling down on the bolts, the gasket forms a seal between the recess bottom and the pipe. A resilient seal O ring 54 is similarly mounted in the groove 28 and it, likewise, forms a seal between the sleeve and the pipe.

The device is assembled by prefabricating the bottom portion containing the depression 22 and sealing same in the tank bottom. The pipe 20 is placed through the opening 24, and the sleeve 30 with the gasket is telescoped over the end of the pipe. The bolts are then passed through the openings in the flange 34 and the nuts placed thereon and pulled down to provide the two seals. Particularly, the device is pulled tight enough to cause a seal of the lower seal 52 between the recess bottom, the ring 48 and the pipe 20. It will be readily seen particularly as detailed in FIG. 3 the pipe is mounted on the gaskets and is free to move in the sleeve 30. The seals prevent leaking during a fairly substantial movement of either the pipe or the bottom of the tank.

The bolts 44 may be securely fixed in position in the ring 48, or they may be slidable into and out of attachment by providing a circular opening which will accommodate the head of the bolt and a bolt shank fitting slot extending therefrom. The latter provides removable bolts for convenience of assembly and repair. The gaskets may be made of any material suitable for extended use in water. In the event of use over a long period of years, it is obvious that the gaskets may be readily changed by merely draining the tank and having a workman replace the gaskets from inside the tank.

While the invention has been illustrated by reference to a specific embodiment, there is no intent to limit the spirit or scope of the invention to the precise details so set forth except as defined in the following claims.

I claim:
1. In combination with a metal bottom of a tank having at least one opening and a metal pipe extending through said opening and having an end portion positioned internally of the tanks, a flexible connector therebetween comprising a short sleeve having a flared end telescoped over the end of said pipe positioned in the tank; a radial flange mounted on and depending outwardly from said sleeve adjacent the end opposite said flared end; a ring secured to inside of the tank bottom and encircling said opening; means on said pipe end portion inside the tank for supporting a gasket; a first resilient gasket adjacent the end of said pipe mounted in gasket-supporting means and sealing the space between said pipe and said sleeve; a second resilient gasket encircling said pipe adjacent the tank bottom and spaced from said first seal for sealing against the pipe the flared end of said sleeve and the tank bottom; and bolt means mounted between and securing said flange and ring together whereby to provide relative lateral flexibility between the pipe and the wall of the opening in the bottom of the tank.

2. In combination with a metal bottom of a tank having at least one opening and a metal pipe having an end portion extending into and positioned inside the tank; a connector therebetween comprising a short sleeve having a flared end telescoped over the end of said pipe extending through said opening; a radial flange depending outwardly from said sleeve adjacent the non-flared end thereof; a ring secured to the inside bottom of the tank and encircling said opening, said pipe having an outwardly directed groove adjacent its end extending through said opening; an O-ring seal mounted in said groove sealing the space between said pipe and said sleeve; a resilient seal encircling said pipe and spaced from said first seal adjacent said tank bottom; and bolt means mounted between said flange and ring for pulling said flared end for sealing engagement of said resilient seal between the pipe, the tank bottom and said flared end of said sleeve, said seals providing relative lateral flexibility between the pipe and the wall of the opening in the bottom of the tank.

References Cited

UNITED STATES PATENTS

| 783,148 | 2/1905 | Snow | 251—144 X |
| 783,878 | 2/1905 | Lydon | 137—590 X |
| 851,365 | 4/1907 | Moore | 251—144 X |
| 1,671,789 | 5/1928 | Smith | 285—337 X |
| 2,764,385 | 9/1956 | Sieling | 251—144 |
| 2,887,328 | 5/1959 | Risley et. al. | 285—337 X |

FOREIGN PATENTS

| 417,200 | 10/1934 | Great Britain. |
| 330,590 | 10/1935 | Italy. |

CARL W. TOMLIN, *Primary Examiner.*

THOMAS F. CALLAGHAN, *Examiners.*